(12) United States Patent
Kalm et al.

(10) Patent No.: US 12,110,181 B1
(45) Date of Patent: Oct. 8, 2024

(54) ITEM RETRIEVAL SYSTEM

(71) Applicant: Amazon Technologies, Inc., Seattle, WA (US)

(72) Inventors: William Scott Kalm, Seattle, WA (US); Matthew Roy Gardner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 415 days.

(21) Appl. No.: 17/398,721

(22) Filed: Aug. 10, 2021

(51) Int. Cl.
*B65G 1/127* (2006.01)
*B65G 35/06* (2006.01)
*B65G 35/08* (2006.01)
*B60P 3/00* (2006.01)
*B65G 1/04* (2006.01)

(52) U.S. Cl.
CPC ............ *B65G 1/127* (2013.01); *B65G 35/06* (2013.01); *B65G 35/08* (2013.01); *B60P 3/007* (2013.01); *B65G 1/0478* (2013.01); *B65G 1/0485* (2013.01)

(58) Field of Classification Search
CPC ......... B60P 3/007; B65G 1/127; B65G 35/06; B65G 35/08

USPC .............................................. 414/331.04, 679
See application file for complete search history.

(56) References Cited

U.S. PATENT DOCUMENTS

| | | | | | |
|---|---|---|---|---|---|
| 3,218,986 | A * | 11/1965 | Goedkoop | ............. | B65G 1/133 |
| | | | | | 198/792 |
| 4,633,998 | A * | 1/1987 | Norfolk | ................ | B65G 35/08 |
| | | | | | 198/803.2 |
| 9,908,713 | B2 * | 3/2018 | Okazaki | ................ | B65G 17/18 |
| 10,273,085 | B2 * | 4/2019 | Battles | ................ | B65G 61/00 |
| 10,815,082 | B2 * | 10/2020 | Kalm | ................... | B65G 69/24 |
| 2019/0375591 | A1 * | 12/2019 | Garcia | ................ | B65G 1/1373 |

FOREIGN PATENT DOCUMENTS

| | | | | |
|---|---|---|---|---|
| DE | 112018000406 T5 * | 10/2019 | ............... | B23Q 7/00 |
| WO | WO-9309045 A1 * | 5/1993 | ............. | B65G 1/127 |

\* cited by examiner

*Primary Examiner* — James Keenan
(74) *Attorney, Agent, or Firm* — Kilpatrick Townsend & Stockton LLP (57) ABSTRACT

An item retrieval system can include a support defining a continuous pathway having an upper level, a lower level, and an end portion connecting the upper and lower portions. An advancement mechanism can move a carrier having a container advanced along the continuous pathway between the upper and lower levels.

19 Claims, 12 Drawing Sheets

ITEM RETRIEVAL SYSTEM

BACKGROUND

Items can be delivered using postal services, courier services, or other similar services. However, prior to delivery, the items are typically sorted and packaged in a warehouse facility. The sorting and packaging of individual or grouped items can be a time intensive process and the packaging material is often discarded shortly after the item is delivered. The items can be shipped to customers using traditional delivery methods, however, these delivery methods can be long and slow and can cause the items to be moved and handled frequently. Additionally, items that are being shipped to customers located in a similar area are often shipped separately and delivered to the customers using delivery vehicles with limited capacity.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples herein are directed to, among other things, systems and techniques relating to an item retrieval system for moving containers filled with inventory items. The techniques described herein may be implemented by any suitable item retrieval system, but particular examples are described that include supports with pathways. The pathways can include an upper portion, a lower portion, and an end portion that connect the upper and lower portions (e.g., to form a whole or partial loop). Carriers (e.g., carriers for transporting containers carrying inventory items) can be positioned in the pathways and moved between the upper and lower portions by an advancement mechanism (e.g., a disk with an extendable arm).

Turning now to a particular example, in this example, an item retrieval system can include a carrier. The carrier can include receiving areas for receiving one or more item containers. The item containers can be used to transport inventory items, for example, around a warehouse environment. The carriers can be positioned on supports, for example, supports that are part of a container carrying assembly. A portion of the carriers can be positioned in a pathway in the supports. The pathway can include upper and lower portions connected by a curved end portion. The carriers can move between the upper portion and the lower portion, for example, to index the containers to sort the items and/or to position the containers for removal of one or more items. The carriers can be moved by an advancement mechanism. The advancement mechanism can include an arm that can rotate and extend to engage with the carriers.

Figure 1:
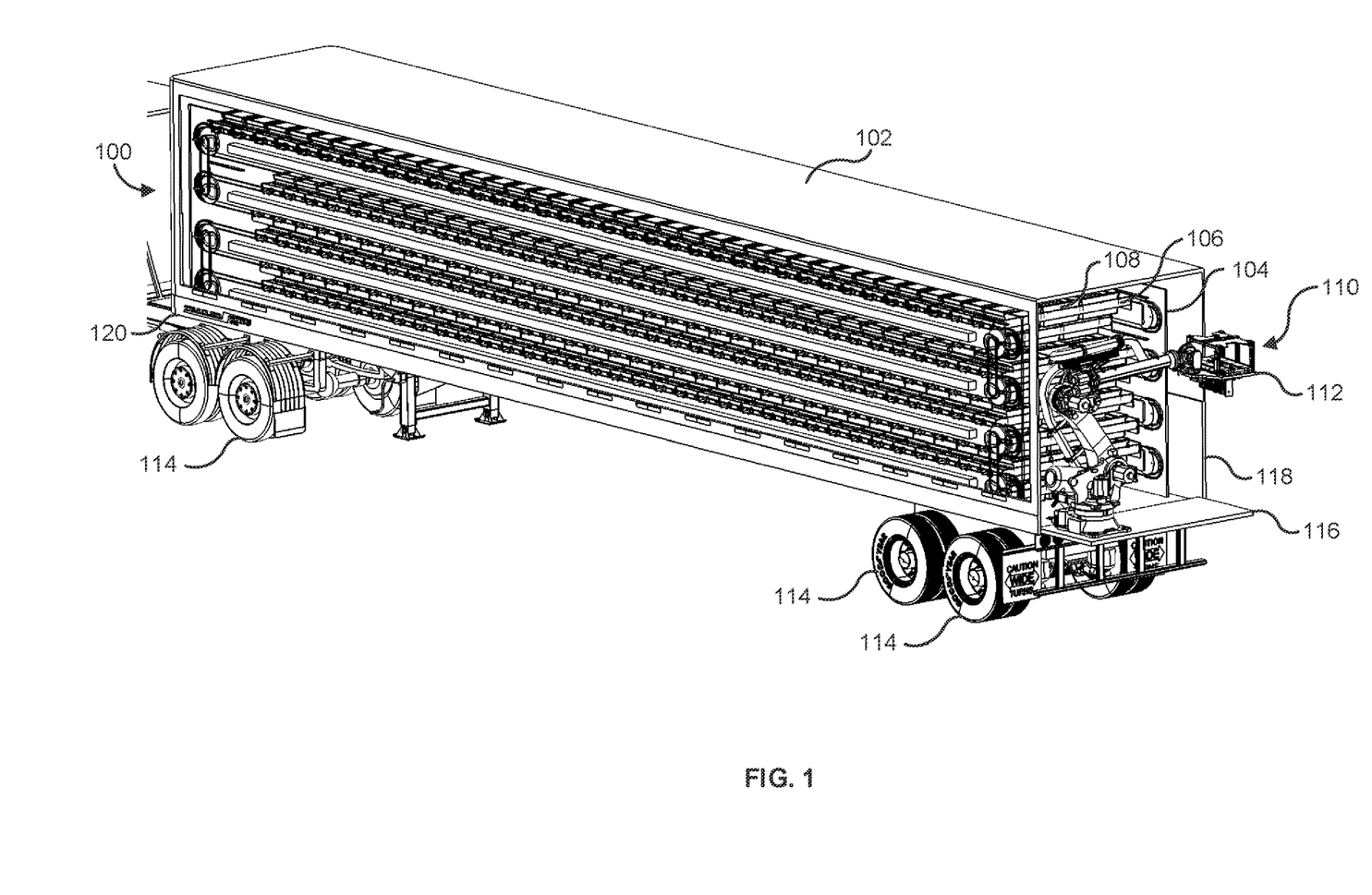
FIG. 1 illustrates an item retrieval system positioned in a moveable trailer, according to various embodiments.

Turning now to the figures, FIG. 1 illustrates an item retrieval system 100 positioned in a moveable trailer 102. The item retrieval system 100 can include a support structure 104 which can include carriers 106 which can support the containers 108. The carriers 106 can be moved along closed pathways for indexing of the containers 108. For example, the pathways can be loops with an upper portion and a lower portion connected by curved ends. Containers 108 can be moved between the upper and lower portions of the loop to sort the containers 108 and/or position the containers 108 for unloading of inventory items. For example, the containers 108 can be moved until they are in position for unloading of inventory items by a robotic manipulator 110. The robotic manipulator 110 can include an end effector 112 for interacting with the containers 108 and/or the inventory items.

The moveable trailer 102 can be or include a structure that can surround the support structure 104. For example, the moveable trailer 102 can be or include a trailer, a storage container, and/or any suitable structure that can transport a large amount of material.

The moveable trailer 102 can include one or more openings such that the item retrieval system 100 can be inserted into and/or removed from the moveable trailer 102. For example, one end of the moveable trailer 102 can include an opening 118 which can allow the item retrieval system 100 to be inserted into the moveable trailer 102. The opening 118 can be sized and shaped such that the whole item retrieval system 100 can be moved into and/or out of the moveable trailer 102 without removing components from the item retrieval system 100. In various embodiments, the moveable trailer 102 and/or the item retrieval system 100 can include components to aid in the movement of the item retrieval system 100 into and/or out of the moveable trailer 102. For example, the moveable trailer 102 and/or the item retrieval system 100 can include wheels, tracks, sleds, conveyance devices, and/or any suitable device to aid in the movement of the item retrieval system 100.

In some embodiments, the item retrieval system 100 can be loaded with items (e.g., containers 108 can be occupied or filled with items and positioned in the item retrieval system 100) and inserted into the moveable trailer 102. After some or all of the items have been removed from the item retrieval system 100 (e.g., the items have been delivered to a delivery destination), the item retrieval system 100 can be removed from the moveable trailer 102 (e.g., to be filled with additional items).

In various embodiments, the moveable trailer 102 can include a drivetrain for movement of the moveable trailer. The drivetrain can include wheels 114 for moving the moveable trailer. The wheels 114 can be powered (e.g., can be driven by a motor) and/or can be non-powered. For example, the wheels 114 can allow the moveable trailer to be pulled by a vehicle (e.g., a truck).

In further embodiments, one end of the moveable trailer 102 can include an attachment point 120. The attachment point 120 can allow the moveable trailer 102 to attach to a device that can move the moveable trailer 102. The attachment point 120 can attach to a truck, tractor, and/or any suitable propulsion device.

In various embodiments, the moveable trailer 102 can include one or more openings for removing items from the moveable trailer 102. For example, the moveable trailer 102 can include an opening where items can be removed by a user and/or a customer once the moveable trailer 102 has reached a desired destination. The user and/or the customer can interact with an input device located on the moveable trailer 102. For example, the user and/or the customer can interact with the input device to enter or indicate a customer order or to otherwise identify the items to be removed from the moveable trailer 102. The identified items can be moved from the carriers 106 and/or to the one or more openings by the robotic manipulator 110.

In further embodiments, the items can be moved to and/or from the one or more openings and/or the customer using a movement device. The movement device can move the items positioned within the moveable trailer 102 and/or items positioned outside (e.g., adjacent to) the moveable trailer 102. The movement device can be or include a robot, a structure, an unmanned aerial vehicle, a customer, a user, and/or any suitable removal device.

In some embodiments, the items can be received by a removal device. For example, items from a customer order can be identified and moved to a position (e.g., the one or more openings) where they can be removed from the moveable trailer 102. The items can be removed from moveable trailer 102 by the removal device and delivered to a customer. However, the items may be removed and positioned in another area (e.g., a pickup area) for removal by the removal device. The removal device can be or include a robot, a structure, an unmanned aerial vehicle, another moveable trailer 102, a customer, a user, any suitable movement device, and/or any suitable removal device.

The robotic manipulator 110 can be or include a robotic arm moveable along multiple axes. For example, the robotic arm can be moveable along six-axes, although any other suitable number greater than or less than six could alternatively be utilized. The end effectors 112 can include one or more attachment points and/or engagement components for attaching to various components and/or containers 108. For example, the end effector 112 can be or include suction, forks, a gripper, hooks, and/or any suitable device for interacting with the items and/or the containers 108. The robotic manipulator 110 can move items from the containers 108 to the openings in the moveable trailer 102. For example, the robotic manipulator 110 can move the items from the containers 108 to the opening for the users.

In various embodiments, the robotic manipulator 110 can be attached to the moveable trailer 102. For example, the robotic manipulator 110 can be mounted to plate 116 positioned at the back of the moveable trailer 102. However, the robotic manipulator 110 can be moveable relative to the moveable trailer 102. For example, the robotic manipulator 110 can be positionable on or near the moveable trailer 102 once the moveable trailer 102 has reached a desired destination.

Figure 2:
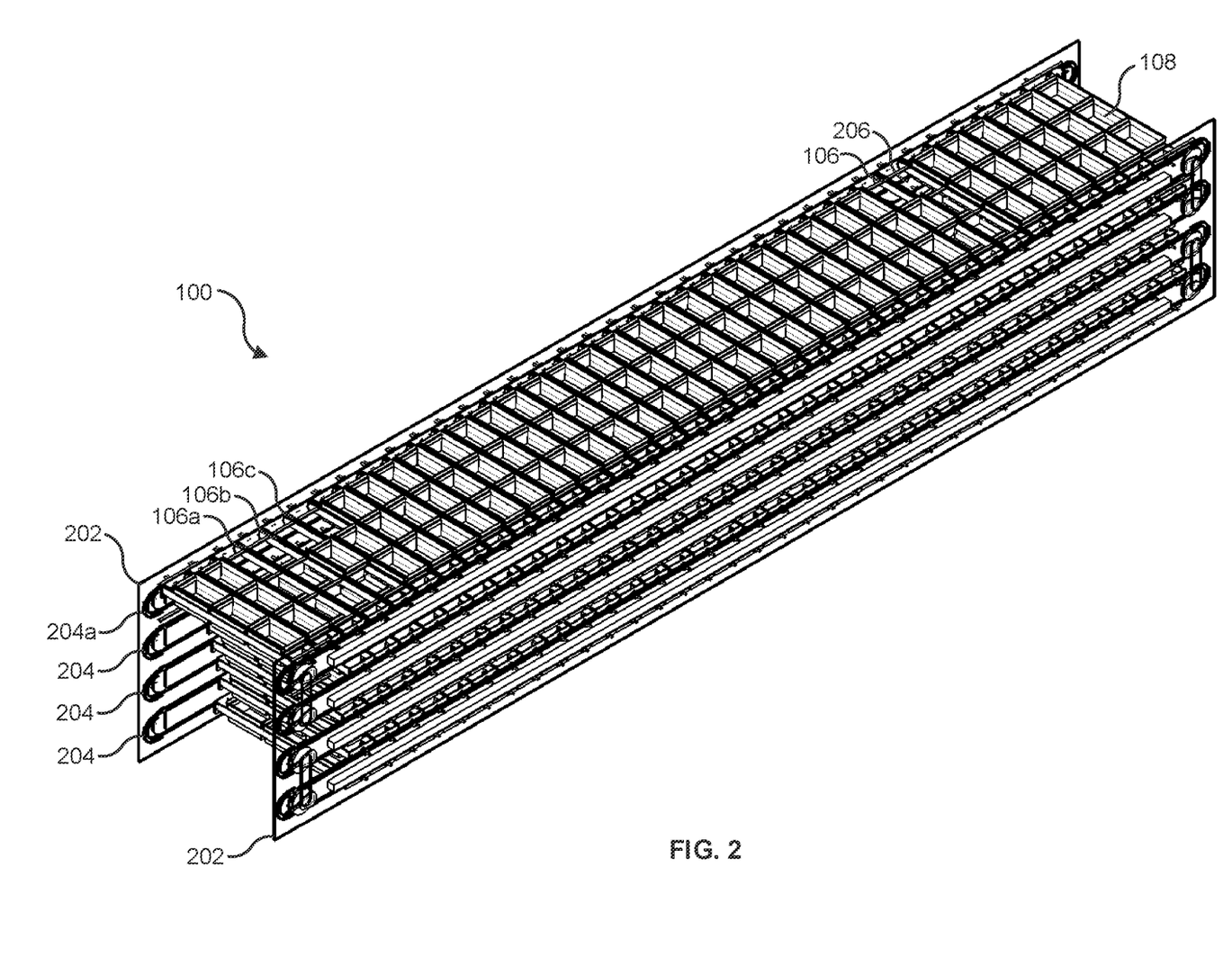
FIG. 2 illustrates the item retrieval system of FIG. 1, according to various embodiments.

FIG. 2 illustrates the item retrieval system 100 of FIG. 1. The item retrieval system 100 can include supports 202 which can support the carriers 106. For example, the carriers 106 can be positioned between the supports 202. The supports 202 can be or include pathways 204 (e.g., the supports 202 can include openings that define the pathways 204). The pathways 204 can be looped (e.g., continuous) pathways that include an upper portion and a lower portion connected by a curved end portion. The looped pathways 204 can allow the carriers 106 to be moved while maintaining positioning relative to one another (e.g., indexed). For example, carriers 106a, 106b, and 106c can remain in the same order as they are moved around the pathway 204a. However, the carriers 106a, 106b, and 106c may be spread across the upper and lower portions of pathway 204a. As an illustrative example, indexing or advancement may be performed until carrier 106a is moved to the lower portion of pathway 204a, carrier 106b is positioned in the curved end portion (e.g., for removal of one or more items from the containers 108), and/or carrier 106c is (e.g., remains) on the upper portion of pathway 204a.

The carriers 106 can include one or more container receiving areas 206 where containers 108 can be positioned on the carriers 106. For example, the container receiving areas 206 can be or include an opening for receiving a container 108. However, the container receiving areas 206 can be or include a surface for receiving the containers 108. In various embodiments, the container receiving areas 206 can be positioned on each carrier 106 such that the containers 108 are in rows on the carriers 106 and/or form columns when the carriers 106 are positioned between the supports 202. As discussed further in reference to FIG. 3, the carriers 106 can be arranged such that the layers of containers 108 are vertically aligned.

In various embodiments, the container receiving areas 206 can secure the containers 108 in position (e.g., such that the containers 108 remain in the container receiving areas 206 when the moveable trailer 102 is being moved). For example, the container receiving areas 206 can be or include an opening that can receive the containers 108 (e.g., the containers 108 can be inserted into the opening). The container receiving areas 206 can additionally or alternatively include an attachment device that can aid in securing the containers 108 in the container receiving areas 206. For example, the container receiving areas 206 can include straps, hooks, loops, chains, magnets, and/or any suitable device for securing the containers 108 in the container receiving areas 206.

The containers 108 can be or include a container or a bin with an interior area for containing one or more items. The containers 108 may include rigid or semi-rigid material, for example, plastic, cardboard, paper, or any suitable material for containing items. In some embodiments, the containers 108 can include handles, hooks, engagement surfaces, suctionable surfaces, or other features and/or components for engaging with the carriers 106. In further embodiments, the containers 108 may be items, e.g., such that the items are moved by the carrier 106 without first being positioned in a container 108.

Figure 3:
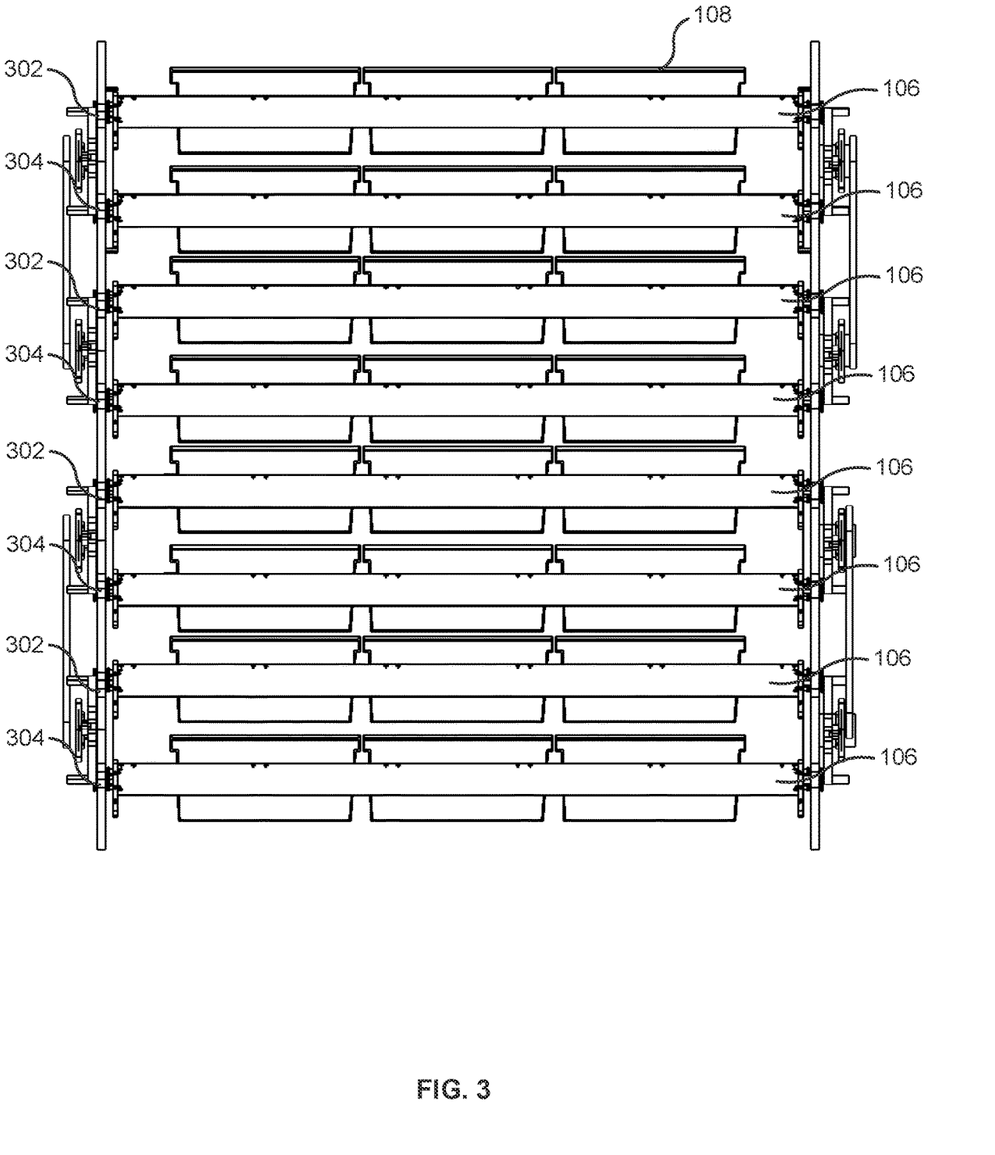
FIG. 3 is a front view of the item staging and retrieval system of FIG. 1, according to various embodiments.

As shown in FIG. 3, the item retrieval system 100 can include multiple layers of pathways 204 and/or carriers 106.

For example, each of the pathways 204 can have an upper level 302 (e.g., an upper portion of the pathway) and a lower level 304 (e.g., a lower portion of the pathway). As discussed in reference to FIG. 4, the upper level 302 and the lower level 304 can be connected with curved ends (e.g., curved end portions) to form a loop.

The carriers 106 can have the same shape and/or locations of the container receiving areas 206 such that the containers 108 on one layer are vertically aligned with the containers 108 on all of the other layers of carriers 106. However, the carriers 106 can have different shapes and/or different locations of the container receiving areas 206 such that only some of the containers 108 are vertically aligned with the containers 108 on the other layers of carriers 106 or none of the containers 108 are vertically aligned with other containers 108.

Figure 4:
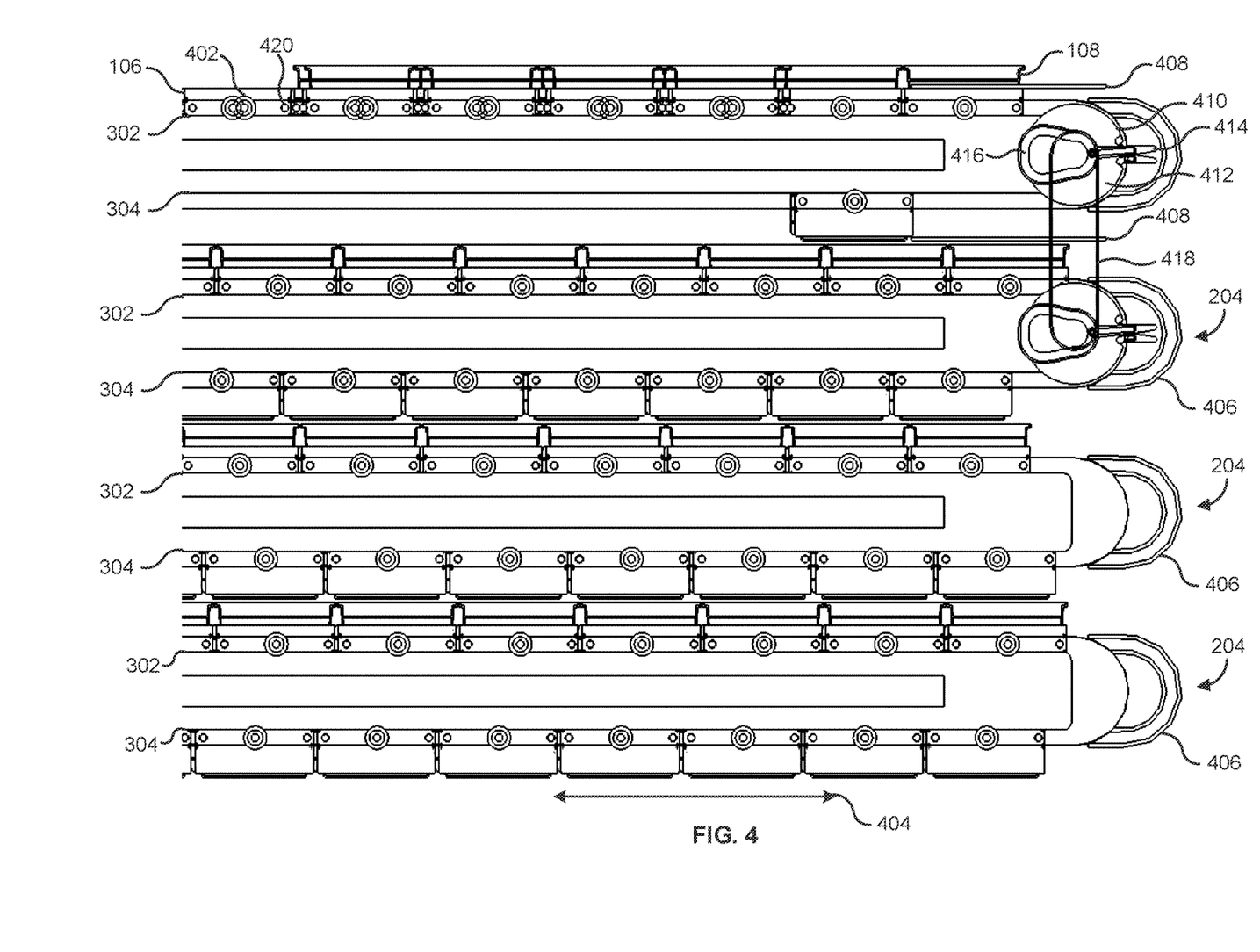
FIG. 4 is a side view of a portion of the item staging and retrieval system of FIG. 1, according to various embodiments.
Figure 5:
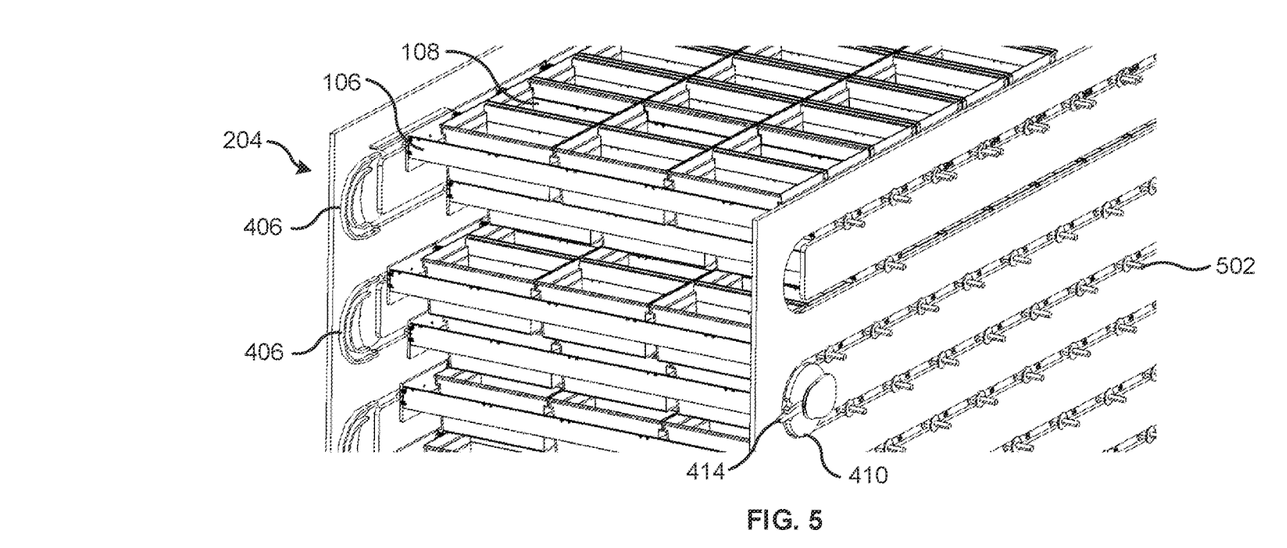
FIG. 5 illustrates a portion of the item staging and retrieval system of FIG. 1, according to various embodiments.

Turning to FIGS. 4 and 5, examples of the pathways 204 for movement of the carriers 106 are shown. FIG. 4 shows a side view of a portion of the item retrieval system 100. The carriers 106 can be positioned to travel in or along pathways 204. For example, the carriers 106 can include a drivetrain 402 that can be positioned in the pathways 204. The drivetrain 402 can include a wheel and/or similar device which can allow the carriers 106 to move along the pathways 204. In various embodiments, the drivetrain 402 can include a propulsion system that can aid in movement of the carriers 106 along the pathways 204. As discussed further in reference to FIG. 6, the carriers 106 can move along the pathways 204 by having the carriers 106 in the same level (e.g., the upper level 302 or lower level 304) engage with one another such that the carriers 106 are pushed along direction 404 (which may correspond to a longitudinal axis of the pathways 204, for example).

The carriers 106 can move along the pathways 204 from the upper level 302 to the lower level 304 via end portion 406 which connects the upper level 302 and the lower level 304. The end portion 406 can be shaped to allow continuous movement of the carriers 106 while being moved between the upper level 302 and the lower level 304. For example, the end portion 406 can be curved to allow the carriers 106 to move in an arc between the upper level 302 and the lower level 304. The arc shaped movement allows the carriers 106 to continue to advance along the pathway 204 without having to stop the carriers 106 and change the movement direction. For example, the carriers 106 can move between the upper level 302 and the lower level 304 without having to stop horizontal movement to switch to vertical movement (e.g., between the upper level 302 and the lower level 304).

As discussed further in reference to FIGS. 11 through 17, the carriers 106 can be moved from the upper level 302 to the lower level 304 such that the containers 108 remain in an upright position. For example, the carriers 106 can move from the upper level 302 and to the lower level 304 with the open top of the containers 108 remaining facing upward. The open top remaining upwards can prevent items from falling out of the containers 108 when the carriers are being moved.

In various embodiments, the pathways 204 can include a high friction area 408. The high friction area 408 can aid in keeping the carriers 106 and/or the containers 108 in a set position. For example, the high friction area 408 can be positioned at the ends of the upper level 302 and the lower level 304 (e.g., before the end portion 406). The high friction area 408 can prevent unintentional movement of the carriers 106 and/or the containers 108 between the upper level 302 and the lower level 304

The carriers 106 can be moved along the pathways 204 using advancement mechanism 410. The advancement mechanism 410 can engage with the carriers 106 to advance the carriers 106 along the movement pathways 204. For example, the advancement mechanism 410 can move the carriers 106 between the upper level 302 and the lower level 304 via the end portion 406. The advancement mechanism 410 can be coupled with the supports 202. In some embodiments, multiple advancement mechanisms 410 can be used to advance the carriers 106. For example, two advancement mechanisms 410 can be positioned on opposing supports 202 (e.g., one on each support 202) such that both advancement mechanisms 410 can be engaged with the same carrier 106 (e.g., to advance the same carrier 106 along the pathways 204). In some embodiments, an advancement mechanism 410 can be positioned at each end of the pathway 204 (e.g., an advancement mechanism 410 at a fore position and an advancement mechanism 410 at an aft position).

In various embodiments, the advancement mechanism 410 can include a disk 412 (e.g., a rotatable disk) and an arm 414. The disk 412 can rotate the arm 414 to engage carriers 106 on the upper level 302 and/or the lower level 304. For example, the disk 412 can rotate that arm 414 into position to engage with the carriers 106. The arm 414 can engage with the carriers 106 and, with the arm 414 engaged with the carriers 106, the disk 412 can rotate to advance the carriers 106 along the pathways 204. The advancement mechanism 410 can be connected with a motor (e.g., to rotate the disk 412). The motor can be connected with the disk 412 to rotate the disk 412 in one or more directions (e.g., a clockwise and/or a counter-clockwise direction).

As shown in FIG. 5, the arm 414 can engage with an engagement pin 502 of the carriers 106. For example, the engagement pin 502 can extend away from the carriers 106 (e.g., through the pathways 204). The arm 414 can engage with the engagement pin 502 and rotate to move the carriers 106. For example, the arm 414 can be positioned behind the engagement pin 502 and pull the engagement pin 502 to advance the carriers along the pathways 204.

In further embodiments, the advancement mechanism 410 can include a hub 416 (e.g., FIG. 4). The hub 416 can include a track that causes the arm 414 to extend (e.g., into position to engage with the carriers 106). However, the advancement mechanism 410 can additionally or alternatively include an actuator to extend the arm 414 into position. For example, the advancement mechanism 410 can include a linear actuator to extend the arm 414 into position for engagement with the carriers 106.

In some embodiments, the advancement mechanisms 410 can be coupled with one another. For example, the advancement mechanisms 410 can be coupled with a belt 418. The belt 418 can be used to rotate multiple advancement mechanisms 410 using a single motor. For example, the belt 418 can be connected to a clutch of the advancement mechanism 410. The clutch of one or more of the advancement mechanisms 410 can engage such that the advancement mechanisms 410 can be rotated by the motor. However, each of the advancement mechanisms 410 can be driven by separate motors.

In various embodiments, the carriers 106 can include guide pins 420 which can aid the carriers 106 moving through pathways 204. For example, the guide pins 420 can be positioned in pathways 204 to help the containers 108 remain in an upright orientation. The guide pins 420 can remain in the pathways 204 while the carriers 106 move between the upper level 302 and the lower level 304 of the pathways 204. For example, the guide pins 420 can move through the upper level 302, the end portion 406, and lower level 304. In some embodiments, one of the guide pins 420 can move through the end portion 406 while a second guide pin 420 moves outside of the end portion 406. For example, the forward-most guide pin 420 (e.g., rightward in FIG. 4) can travel through the end portion 406 while the rear-most guide pin (e.g., leftward in FIG. 4) travels outside of the end portion 406.

Figure 6:
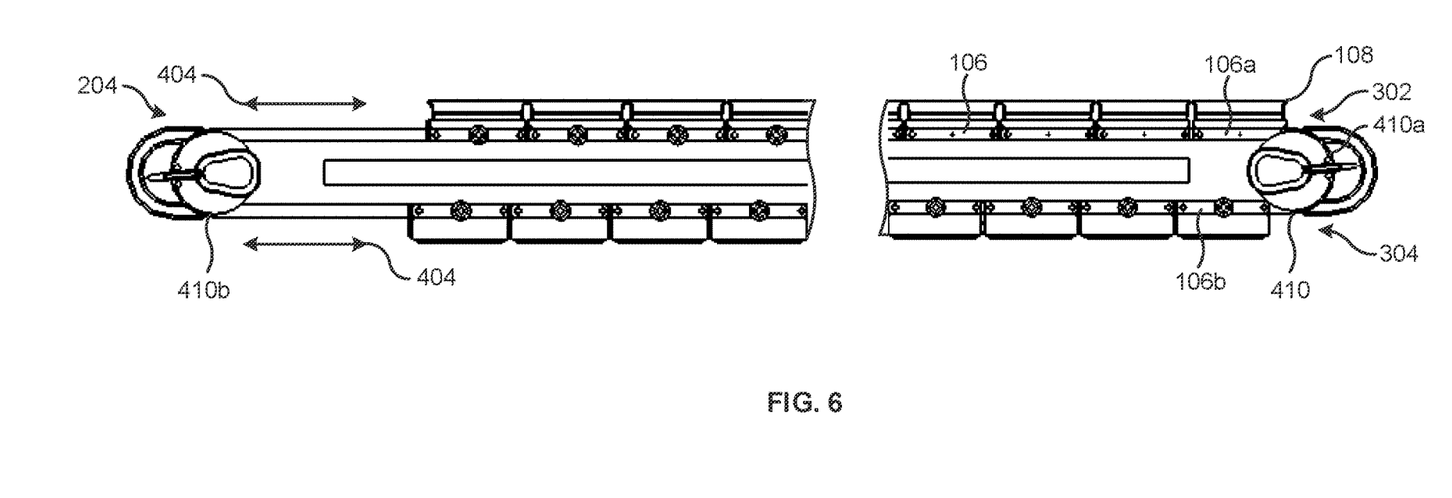
FIG. 6 illustrates a pathway of the item staging and retrieval system of FIG. 1, according to various embodiments.

Turning to FIG. 6, a pathway 204 of the item retrieval system 100 is shown. The middle portion of the pathway 204 has been omitted to help with clarity, however, it will be understood that additional carriers 106 with containers 108 can be included. Multiple advancement mechanisms 410 can be positioned adjacent to the pathway 204 (e.g., coupled with the support 202). A first advancement mechanism 410a can be positioned at a fore position and a second advancement mechanism 410b can be positioned at an aft position The carriers 106 can be positioned in the pathway 204 such that the carriers 106 fill the upper level 302 and the lower level 304. The carriers 106 can be positioned such that moving a carrier 106 between the upper level 302 and the lower level 304 causes other carriers 106 to move. For example, carrier 106a can be moved from the upper level 302 to the lower level 304 (e.g., by advancement mechanism 410a). The carrier 106a can engage with carrier 106b and push carrier 106b and the other carriers 106 on the lower level 304 (e.g., along direction 404). The carriers 106 can be pushed until a carrier 106 on the lower level 304 is in position to be engaged by advancement mechanism 410b. Similarly, advancement mechanism 410a can move carrier 106b from the lower level 304 to the upper level 302. The carrier 106b can engage with carrier 106a and push carrier 106a and the rest of the carriers on the upper level 302 until a carrier 106 on the upper level 302 is in position for engagement with the advancement mechanism 410b.

Figure 7:
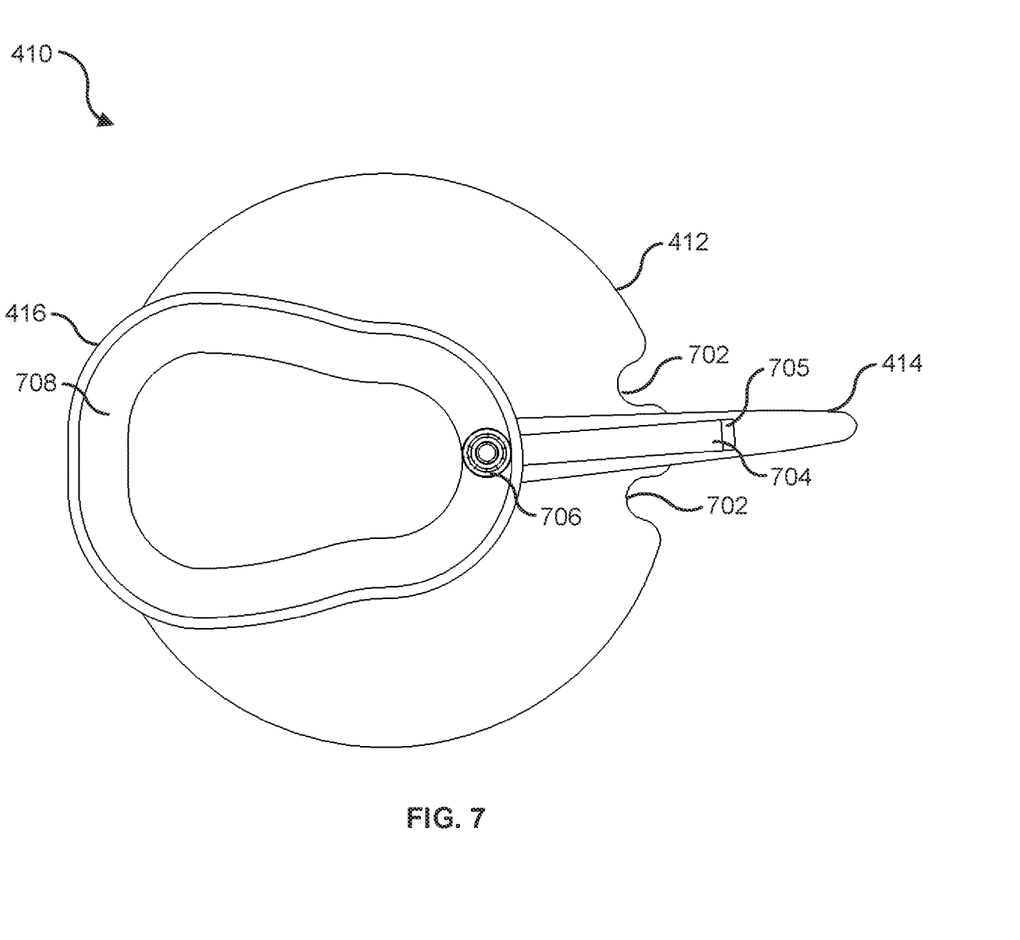
FIG. 7 is an advancement mechanism for use with the item staging and retrieval system of FIG. 1, according to various embodiments.
Figure 8:
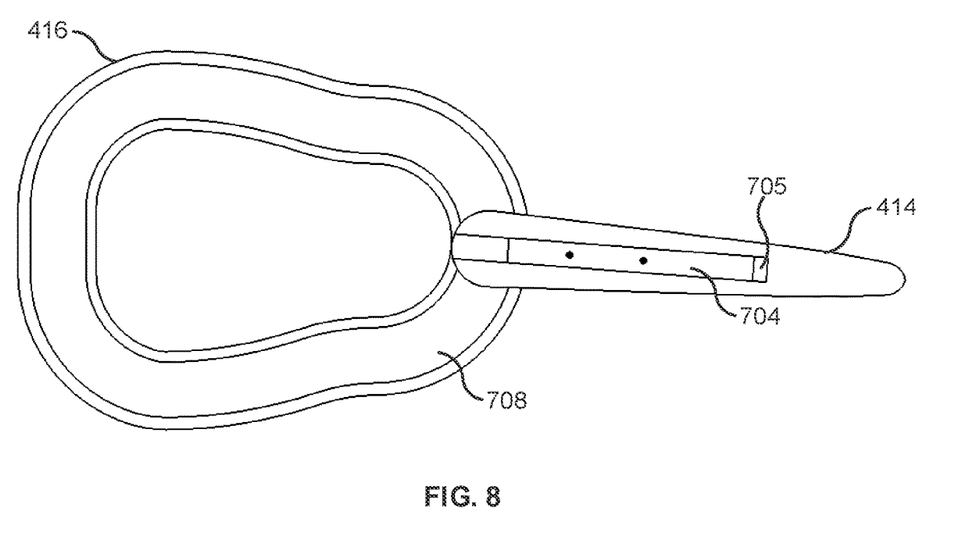
FIGS. 8 and 9 show a portion of the advancement mechanism of FIG. 7 in various positions, according to various embodiments.
Figure 9:
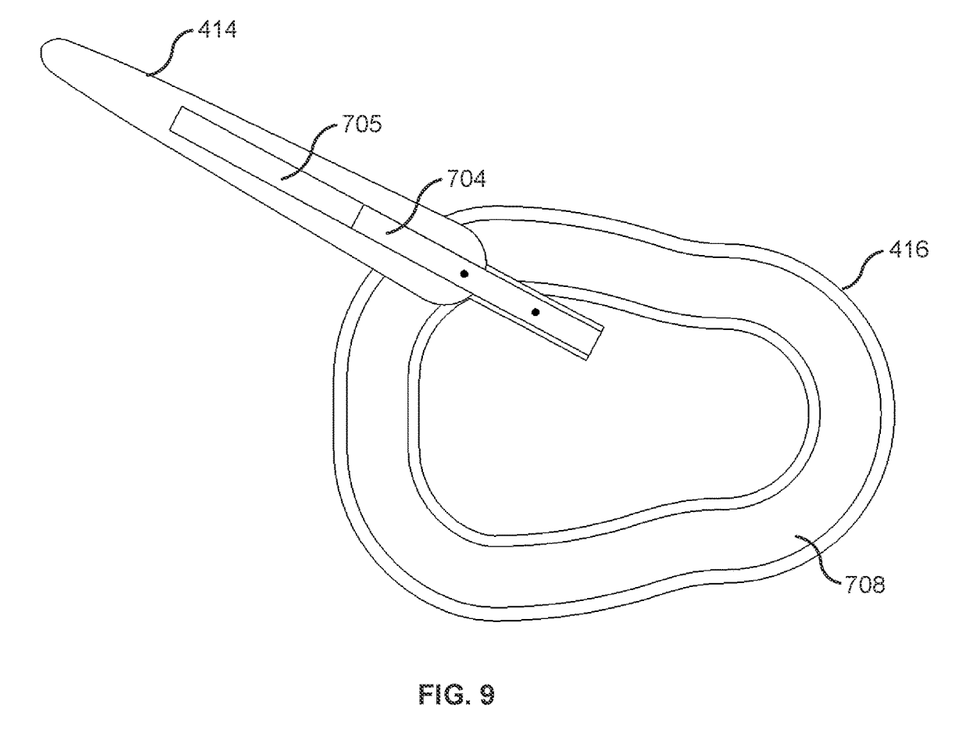

Turning to FIGS. 7 through 9, an example advancement mechanism 410 is shown. The advancement mechanism 410 includes a disk 412, an arm 414, and a hub 416, however, additional and/or alternative components may be included. The disk 412 can include one or more slots 702. The notches can receive a portion of the carriers 106 (e.g., when the carriers 106 are moving through the end portion 406 of the pathways 204). For example, the slots 702 can receive the drivetrain 402 and/or the engagement pins 502 to aid in supporting the carriers 106 during travel through the end portion 406. One slot 702 can support the carriers 106 when the carriers 106 travel in a first direction through the end portion 406 and the other slot 702 can support the carriers 106 when the carriers 106 travel in the opposite direction through the end portion 406.

The advancement mechanism 410 can include a slide 704 coupled with the disk 412 (e.g., with fasteners). The slide 704 can allow the arm 414 to extend relative to the disk 412 (e.g., to engage with the carriers 106). The slide 704 can be positioned in an opening 705 in the arm 414. The opening 705 can allow the arm 414 to move relative to the disk 412 (e.g., the slide is received in the opening when the arm 414 is in the retracted position). In various embodiments, the advancement mechanism 410 can include a bearing 706 that can allow the arm 414 to rotate. In various embodiments, a portion of the bearing 706 can travel along a track 708 in the hub 416 (e.g., as shown in FIGS. 8 and 9).

In FIGS. 8 and 9 the disk 412 has been omitted, however, it will be understood that the arm 414 is attached to the disk 412. As the arm 414 is rotated (e.g., by the disk 412) the arm 414 moves relative to the slide 704 to extend the arm 414 (e.g., for engagement with the carriers 106). For example, as shown in FIG. 8, the arm 414 is in a retracted position (e.g., the slide 704 substantially fills the opening 705). As the arm 414 is rotated, a proximal end of the arm 414 follows the track 708 of the hub 416. The track 708 can have a shape that causes the arm 414 to move on the slide 704 (e.g., the arm 414 can extend). For example, the track 708 can be asymmetrical such that a first portion of the track 708 is closer to a rotational axis of the disk 412 than a second portion. As shown in FIG. 9, the arm 414 can be rotated to a position where the arm 414 is in the extended position (e.g., the slide 704 is substantially external to the opening 705 or fills the opening 705 less than in the retracted position).

Figure 10:
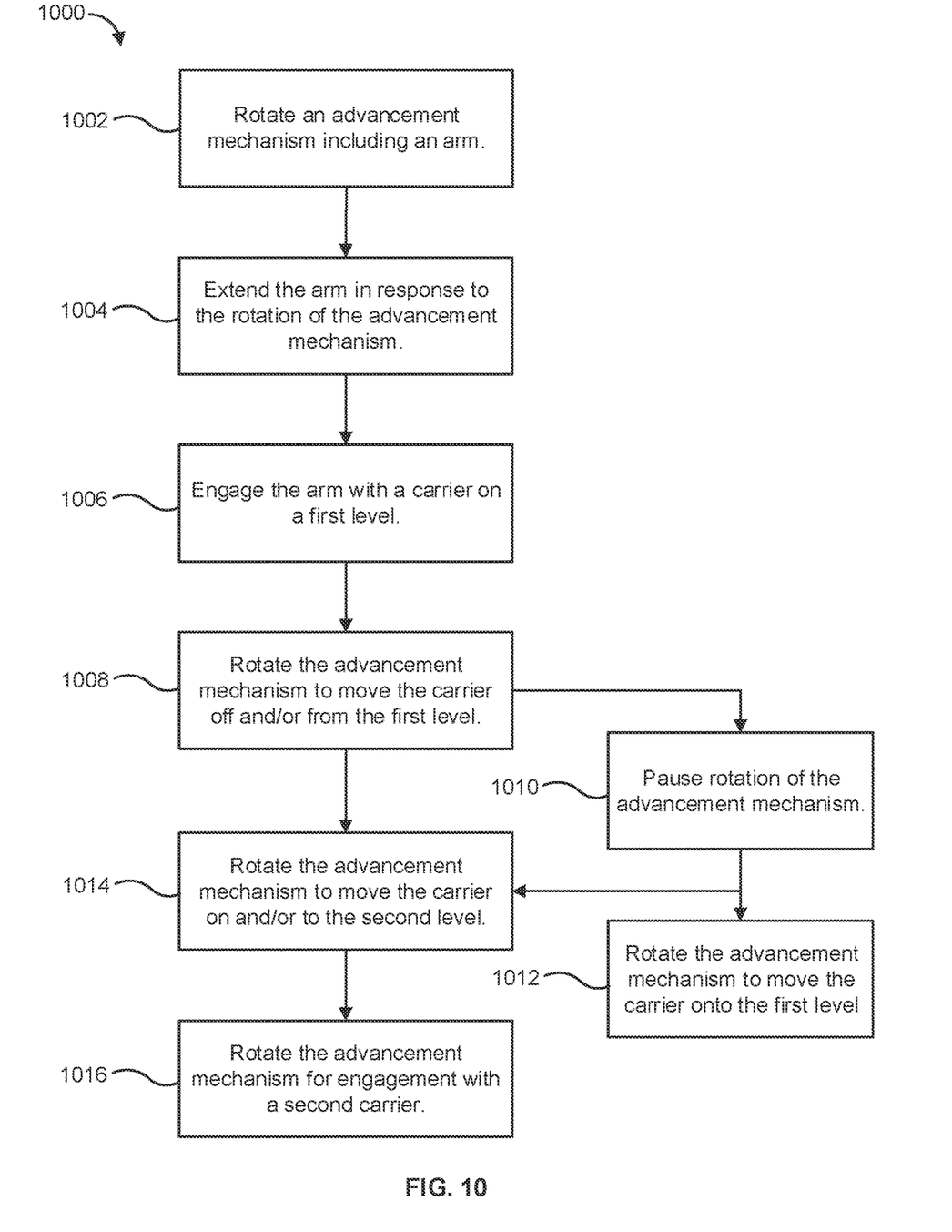
FIG. 10 is a flowchart illustrating a process for moving and staging items using the item staging and retrieval system of FIG. 1, according to various embodiments.

Turning now to FIG. 10, a flowchart illustrating a process 1000 for moving carriers 106 having containers 108 using the item retrieval system 100 of FIG. 1 is shown. Various blocks of the process 1000 are described by reference the components shown in FIGS. 11 through 17, however, additional or alternative components may be used with the process. FIGS. 11 through 17 illustrate the example process 1000 using particular embodiments of the example item retrieval system 100 of FIG. 1.

Figure 11:
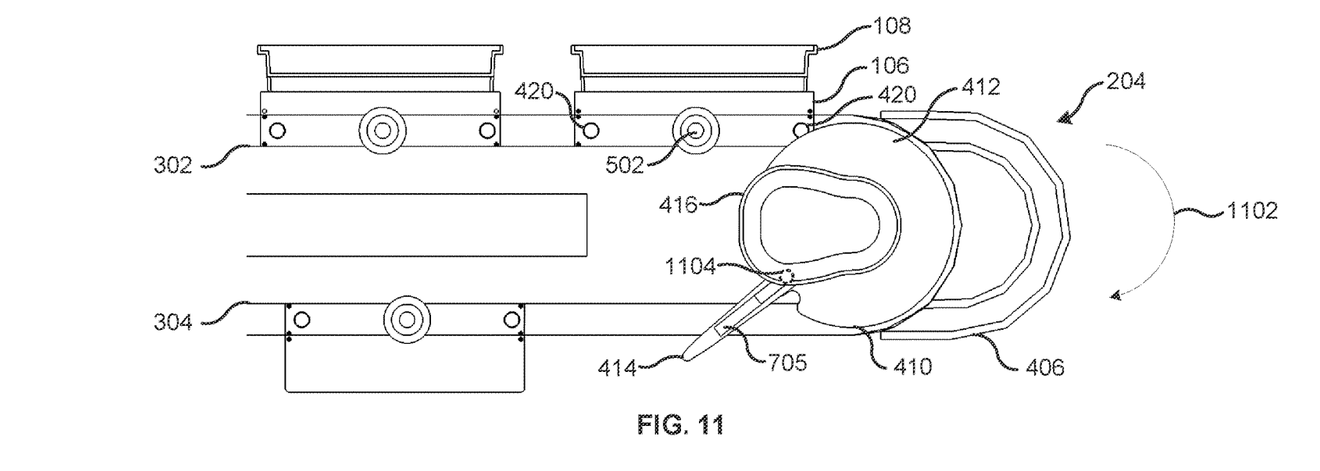
FIGS. 11 through 17 illustrate various states of components that may be implemented in a simplified example process for moving and staging items that can be used with the item staging and retrieval system of FIG. 1.

The process 1000 at block 1002 can include rotating an advancement mechanism (e.g., advancement mechanism 410) including an arm (e.g., arm 414). The advancement mechanism 410 can include a disk 412 that the arm 414 is connected to. The disk 412 can be connected to a motor which can rotate the advancement mechanism 410. FIG. 11 illustrates the advancement mechanism 410 rotating in direction 1102. The arm 414 can be in a partially extended state, for example, due to rotation of the advancement mechanism 410. For example, a proximal end 1104 of the arm 414 can follow the track of the hub 416. The track can have an asymmetrical shape that can cause the arm 414 to move relative to the disk 412.

Figure 12:
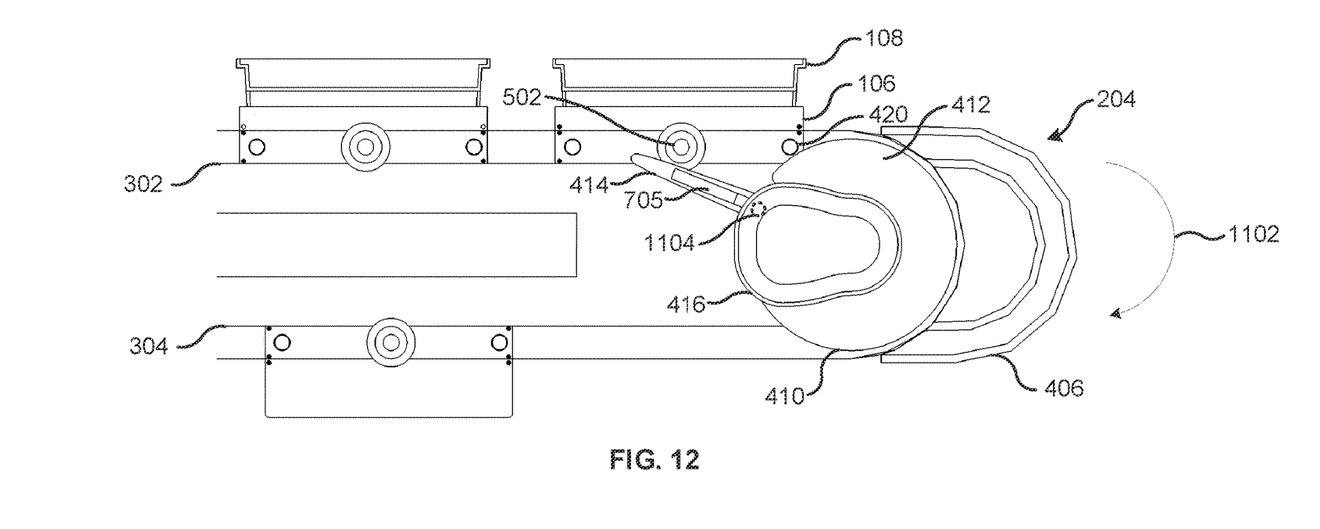

The process 1000 at block 1004 can include extending the arm 414 in response to the rotation of the advancement mechanism 410. FIG. 12 illustrates the arm 414 in the extended state after rotation of the advancement mechanism rotating in direction 1102. The proximal end 1104 has moved from a lower quadrant to an upper quadrant of the track. The movement of the proximal end 1104 along the track can cause the arm 414 to extend. For example, the upper quadrant of the track can cause the proximal end 1104 to be farther away from the rotation point of the advancement mechanism 410 than the lower quadrant. The further distance causes the arm 414 to move further away from the disk 412. In the extend state, a greater amount of the opening 705 of the arm 414 can be unoccupied than in the partially extended or retracted state.

The process 1000 at block 1006 can include engaging the arm 414 with a carrier 106 (e.g., carrier 106) on a first level (e.g., upper level 302). FIG. 12 illustrates the arm 414 engaged with the carrier 106 on the upper level 302. The arm 414 can engage with an engagement pin (e.g., engagement pin 502) of the carrier 106. The arm 414 can engage with the engagement pin 502 and rotate in direction 1102. The advancement mechanism 410 can continue to rotate in direction 1102 and pull the carrier 106 along the pathway 204 (e.g., in a horizontal direction.

Figure 13:
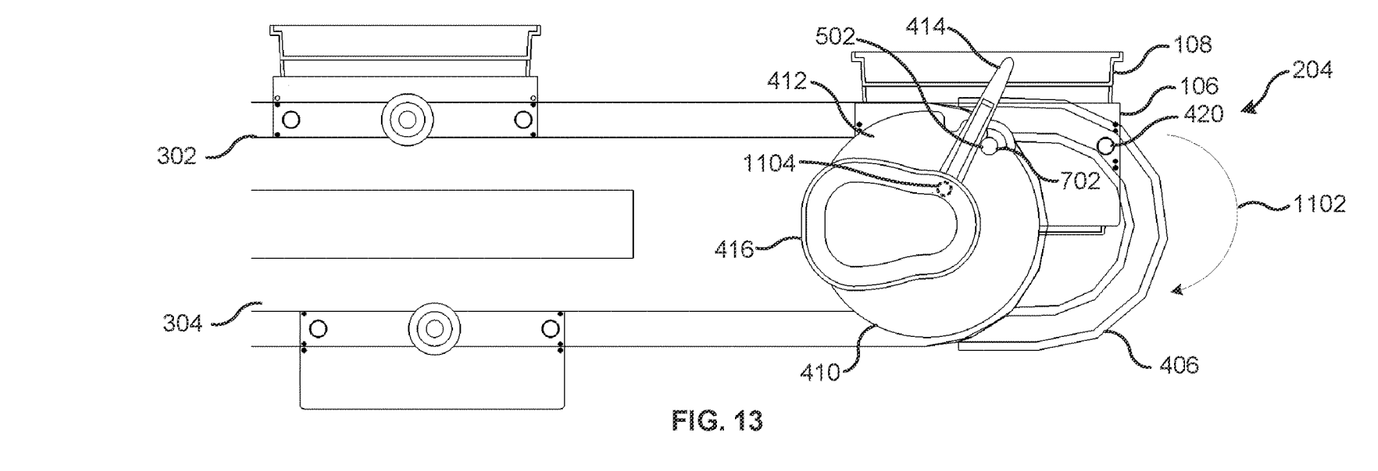

The process 1000 at block 1008 can include rotating the advancement mechanism 410 to move the carrier 106 off of the first level (e.g., off of the upper level 302). FIG. 13 illustrates the carrier 106 after being advanced off of the upper level 302 and into end portion 406. The engagement pin 502 can be received in slot 702 of the disk 412. The slot 702 can receive the engagement pin 502 and support the carrier 106. A guide pin 420 can be positioned in the end portion 406 to further support the carrier 106.

Figure 14:
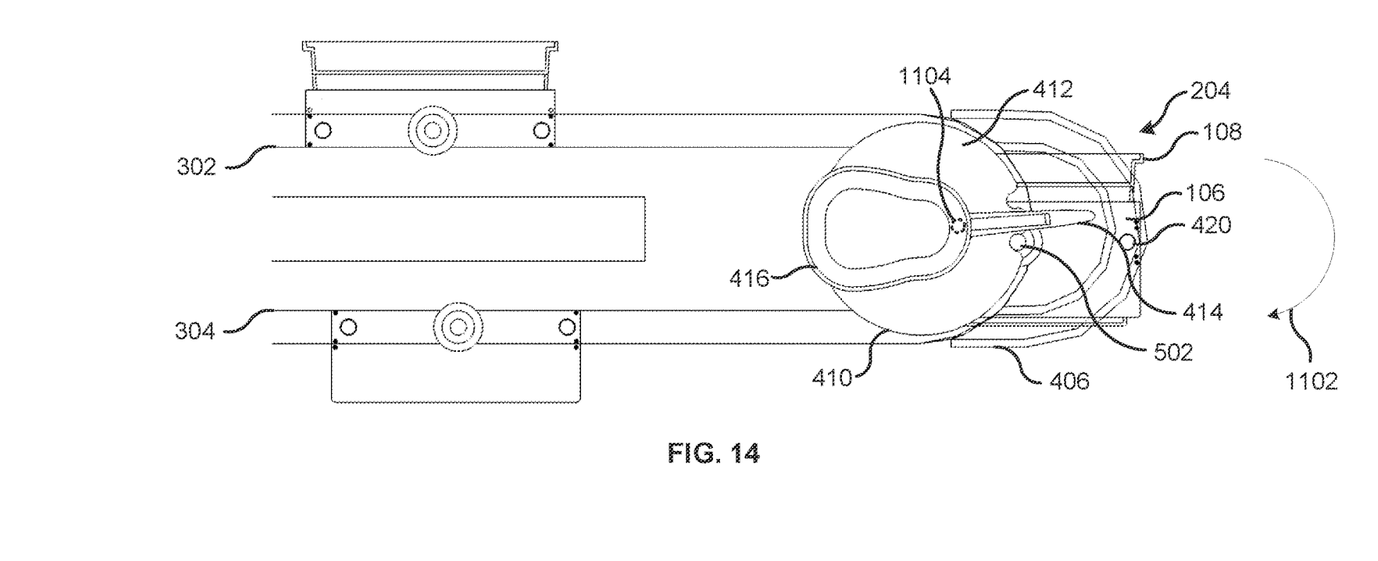

In various embodiments, the process 1000 can include pausing the rotation of the advancement mechanism 410, for example, at block 1010. The advancement mechanism 410 can be paused when the carrier 106 is positioned between the upper level 302 and the lower level 304. FIG. 14 illustrates the carrier 106 with the advancement mechanism 410 paused. The advancement mechanism 410 can be paused to allow for one or more items to be removed from an inventory container (e.g., container 108). While the carrier 106 is being moved between the upper level 302 and the lower level 304, a guide pin 420 (e.g., a rearward or back guide pin) can be moved out of the pathway 204. For example, the rotation of the advancement mechanism 410 can cause the carrier 106 to lower, which can cause the back guide pin 420 to miss entering the pathway in the end portion 406. The back guide pin 420 can be offset from the disk 412 such that the back guide pin 420 can pass behind the disk 412 without interfering with the operation of the disk 412.

The process 1000 can include resuming the rotation of the advancement mechanism 410. In some embodiments, the process 1000 at block 1012 can include rotating the advancement mechanism 410 to position the carrier 106 back on the upper level 302. For example, the advancement mechanism 410 can rotate the carrier 106 (e.g., counter-clockwise or counter to the direction 1102) to position the carrier back to the position shown in FIG. 12.

Figure 15:
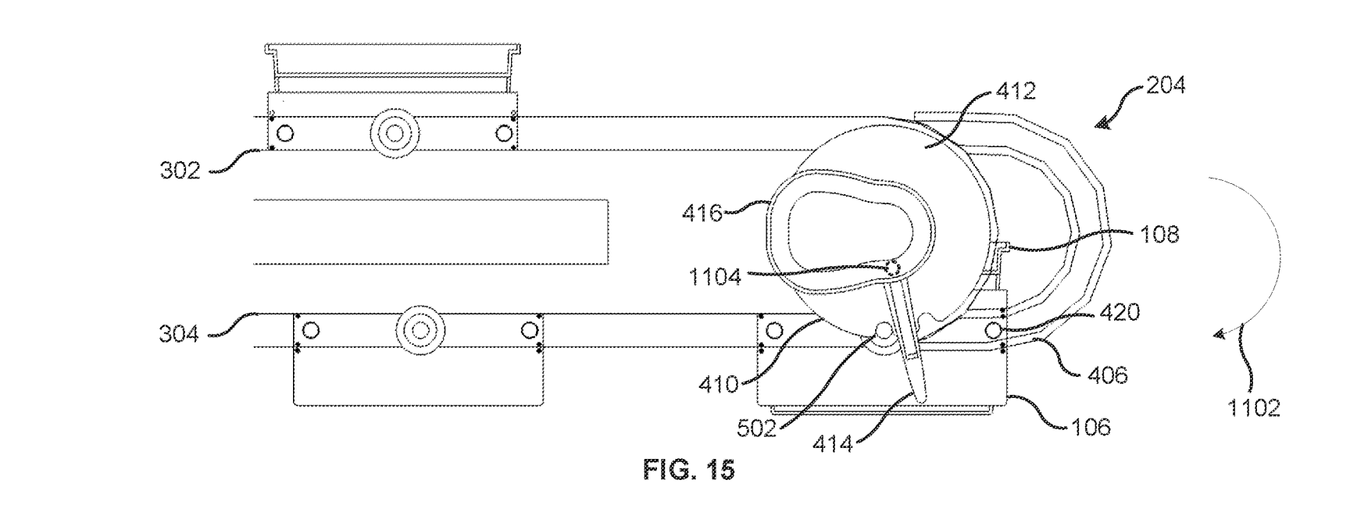
Figure 16:
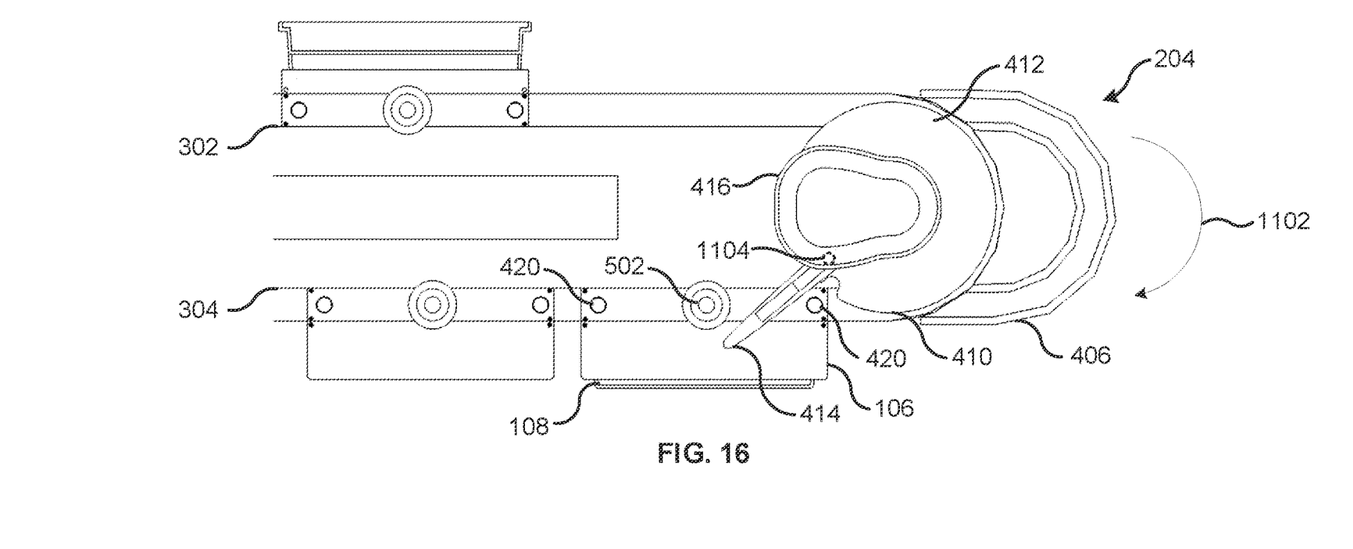

In further embodiments, the process 1000 at block 1014 can include rotating the advancement mechanism 410 to move the carrier 106 to the lower level 304. As shown in FIGS. 15 and 16, the advancement mechanism 410 can position the carrier 106 on the lower level 304 and/or advance the carrier 106 on the lower level 304. For example, the advancement mechanism 410 can continue to rotate in direction 1102 after the carrier 106 has been positioned on the lower level 304, and the arm 414 can be used to push the carrier 106. The arm 414 can engage with the engagement pin 502 to push the carrier 106.

Figure 17:
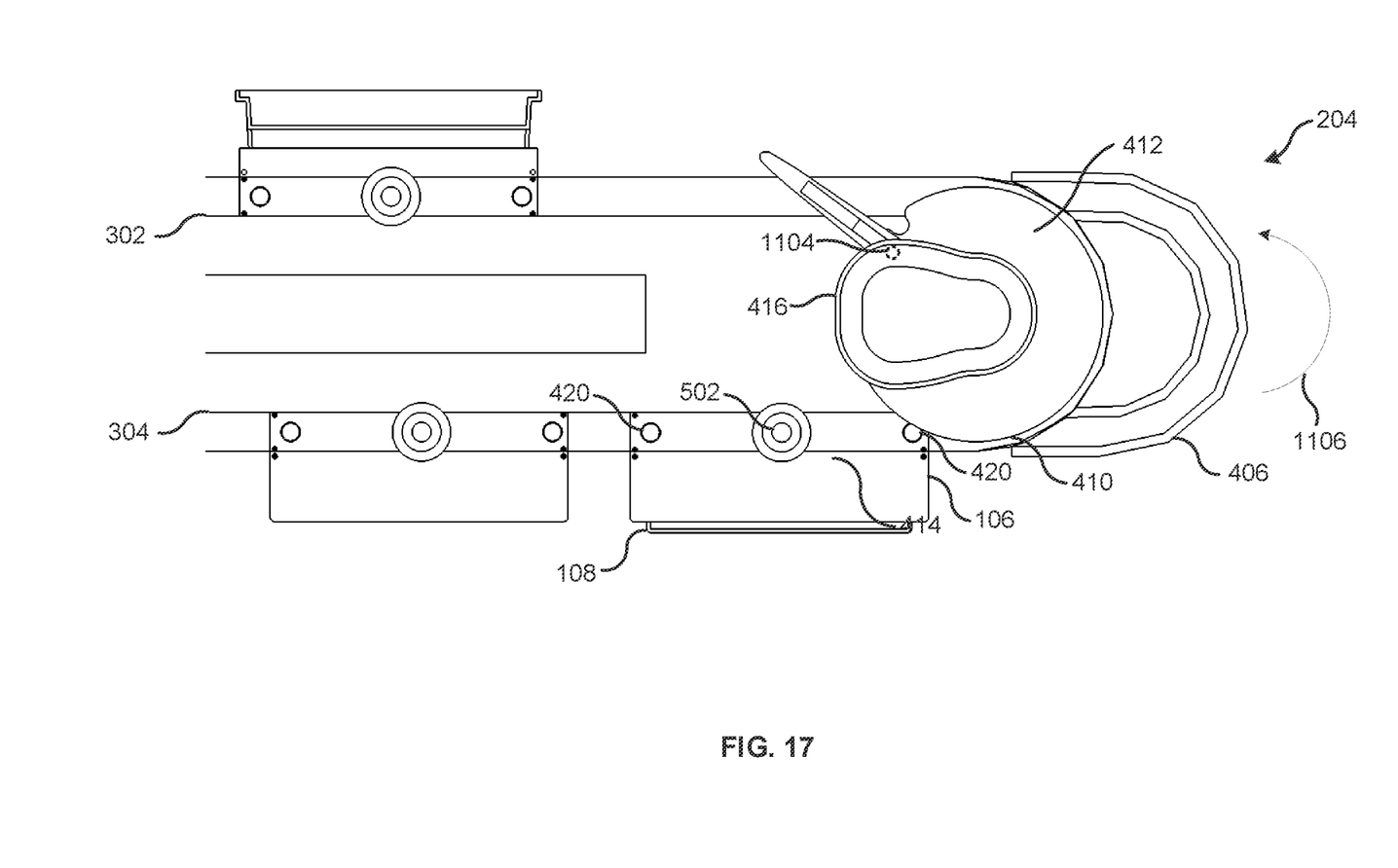

The process 1000 at block 1016 can include rotating the advancement mechanism 410 for engagement with a second carrier 106. FIG. 17 illustrates the advancement mechanism 410 after it has disengaged with carrier 106. The advancement mechanism 410 can remain in position until an advancement mechanism 410 on an opposing end of the item retrieval system 100 pushes the carriers 106 on the upper level 302 into position for engagement by the arm 414 of the advancement mechanism 410. However, the advancement mechanism 410 can additionally or alternatively rotate in direction 1106 to move the carrier 106 from the lower level 304 to the upper level 302.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An item retrieval system positionable in a trailer, the item retrieval system comprising:
   a carrier comprising one or more receiving areas for receiving an item container;
   a support defining a continuous pathway configured to support the carrier, the continuous pathway comprising an upper portion, a lower portion, and a curved end portion coupling the upper and lower portions; and
   an advancement mechanism coupled with the support and comprising a rotatable disk and an extendable arm coupled with the rotatable disk, the rotatable disk comprising one or more notches and configured to rotate to cause both engagement of the extendable arm with a first portion of the carrier and receipt of a second portion of the carrier by at least one notch of the one or more notches to advance the carrier along the continuous pathway to move the carrier between the upper and lower portions.

2. The item retrieval system of claim 1, wherein the carrier comprises a guide pin positionable in the continuous pathway, the guide pin remaining in the continuous pathway when the carrier is moved between the upper and lower portions.

3. The item retrieval system of claim 2, wherein the second portion of the carrier received by the at least one notch is the guide pin of the carrier.

4. The item retrieval system of claim 1, wherein rotation of the rotatable disk causes a proximal end of the extendable arm to move along a track to extend the extendable arm in a direction away from an edge of the rotatable disk to engage a distal end of the extendable arm with the first portion of the carrier.

5. An item retrieval system, comprising:
a support defining a continuous pathway comprising an upper portion, a lower portion, and a curved end portion coupling the upper and lower portions; and
an advancement mechanism comprising a rotatable disk and an extendable arm coupled with the rotatable disk, the rotatable disk comprising one or more notches and configured to rotate to cause both engagement of a distal end of the extendable arm with a first portion of a carrier and receipt of a second portion of the carrier by at least one notch of the one or more notches, the second portion of the carrier positioned in a container receiving area of the continuous pathway for receiving an inventory container containing inventory items, the extendable arm configured to advance the carrier along the continuous pathway to move the carrier between the upper and lower portions.

6. The item retrieval system of claim 5, wherein the support comprises a plurality of continuous pathways, each of the plurality of continuous pathways comprising an upper portion, a lower portion, and a curved end portion coupling the upper and lower portions.

7. The item retrieval system of claim 6, wherein each of the plurality of continuous pathways are configured to support a plurality of carriers, the plurality of carriers moveable along each of the continuous pathways between the upper and lower portions.

8. The item retrieval system of claim 5, wherein the advancement mechanism further comprises an extension track engaged with a proximal end of the extendable arm.

9. The item retrieval system of claim 8, wherein rotation of the rotatable disk causes the proximal end of the extendable arm to move along the extension track to extend the extendable arm to engage the distal end of the extendable arm with the first portion of the carrier.

10. The item retrieval system of claim 5, wherein the continuous pathway is further configured to receive a guide pin of the carrier, the guide pin remaining in the continuous pathway when the carrier is moved between the upper and lower portions of the continuous pathway.

11. The item retrieval system of claim 10, wherein the second portion of the carrier received by the at least one notch is the guide pin of the carrier.

12. The item retrieval system of claim 5, wherein the advancement mechanism is a first advancement mechanism positioned at a fore position of the support and the item retrieval system further comprises a second advancement mechanism positioned at an aft position of the support.

13. The item retrieval system of claim 12, further comprising a plurality of carriers positioned such that the carriers fill the upper and lower portions of the continuous pathway and such that moving an end-most carrier with the first advancement mechanism positions another carrier in position for engagement by the second advancement mechanism.

14. The item retrieval system of claim 13, wherein moving a carrier of the plurality of carriers from the upper portion to the lower portion causes movement of containers on the lower portion, and wherein movement of a carrier of the plurality of carriers from the lower portion to the upper portion causes movement of containers on the upper portion.

15. A method comprising:
rotating an advancement mechanism to a first position, the advancement mechanism positioned relative to a guide forming a movement path for a carrier positioned on the guide, the carrier comprising containers having inventory items;
extending, in response to the rotating of the advancement mechanism to the first position, an arm of the advancement mechanism to be positioned for engagement with the carrier, the advancement mechanism comprising a disk and the arm coupled with the disk;
engaging the arm with a first portion of the carrier while receiving a second portion of the carrier in a notch of the disk; and
with the arm engaged with the first portion of the carrier, rotating the advancement mechanism to a second position, the notch supporting the second portion of the carrier and the rotating of the arm causing the carrier to advance along the movement path.

16. The method of claim 15, wherein the carrier is moved between an upper portion of the guide to a lower portion of the guide via a curved end portion extending between the upper portion of the guide and the lower portion of the guide.

17. The method of claim 15, further comprising pausing rotation of the arm at a position for removal of at least one of:
an inventory item from a container; or
a container from the carrier.

18. The method of claim 15, wherein the second portion of the carrier received in the notch of the disk is a guide pin.

19. The method of claim 15, wherein the advancement mechanism further comprises a hub containing an asymmetrical track and wherein extending the arm comprises advancing a proximal end of the arm along the asymmetrical track in the hub from a first portion of the asymmetrical track to a second portion of the asymmetrical track.

* * * * *